United States Patent
Noto et al.

(10) Patent No.: US 10,690,243 B2
(45) Date of Patent: Jun. 23, 2020

(54) RANGE SWITCHING DEVICE FOR AUTOMATIC TRANSMISSION AND SWITCHING METHOD THEREFOR

(71) Applicant: Hitachi Automotive Systems, Ltd., Hitachinaka-shi, Ibaraki (JP)

(72) Inventors: Yuji Noto, Isesaki (JP); Hideki Sekiguchi, Isesaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 165 days.

(21) Appl. No.: 15/028,312

(22) PCT Filed: Sep. 19, 2014

(86) PCT No.: PCT/JP2014/074947
§ 371 (c)(1),
(2) Date: Apr. 8, 2016

(87) PCT Pub. No.: WO2015/060048
PCT Pub. Date: Apr. 30, 2015

(65) Prior Publication Data
US 2016/0298761 A1    Oct. 13, 2016

(30) Foreign Application Priority Data

Oct. 24, 2013  (JP) ................. 2013-220969

(51) Int. Cl.
*F16H 61/32* (2006.01)
*F16H 63/38* (2006.01)
(Continued)

(52) U.S. Cl.
CPC .......... *F16H 61/32* (2013.01); *F16H 59/08* (2013.01); *F16H 63/3425* (2013.01);
(Continued)

(58) Field of Classification Search
CPC .......... F16H 59/04; F16H 59/08; F16H 61/32; F16H 63/38; F16H 63/3425; F16H 63/3466
See application file for complete search history.

(56) References Cited

U.S. PATENT DOCUMENTS 7,367,244 B2 * 5/2008 Shimamura ............. F16H 61/24
74/335
2013/0175963 A1 7/2013 Yamada

FOREIGN PATENT DOCUMENTS

EP    1 113 195 A1    7/2001
JP    07-190187    *    7/1995
(Continued)

OTHER PUBLICATIONS

Machine translation of JP 2003148608.*
(Continued)

*Primary Examiner* — William C Joyce
*Assistant Examiner* — Randell J Krug
(74) *Attorney, Agent, or Firm* — Crowell & Moring LLP (57) ABSTRACT

The present invention relates to a range switching device for performing range switching of an automatic transmission by using an actuator that is electrically controlled to be driven, and to a switching method thereof. A range switching device of an automatic transmission that can reduce collision noise occurring from a detent mechanism and a switching method thereof are provided. The automatic transmission includes a detent mechanism that presses a roller against a groove by using a spring, moves the roller between grooves, and determines a range position of the transmission, and a range of the transmission is changed by driving the detent mechanism by the actuator. In changing a range position of the transmission, the actuator is braked in accordance with a drawing force of the spring into a groove so that energy of (Continued)

the velocity when the roller reaches a target stop position can be controlled to approach zero.

10 Claims, 9 Drawing Sheets

(51) Int. Cl.
    *F16H 63/34*        (2006.01)
    *F16H 59/08*        (2006.01)

(52) U.S. Cl.
    CPC ......... *F16H 63/3466* (2013.01); *F16H 63/38* (2013.01); *F16H 2061/326* (2013.01)

(56) References Cited

FOREIGN PATENT DOCUMENTS

| | | | | |
|---|---|---|---|---|
| JP | 7-190187 | A | 7/1995 | |
| JP | 2003-148599 | A | 5/2003 | |
| JP | 2003-148608 | * | 5/2003 | ............. F16H 61/28 |
| JP | 2003-148608 | A | 5/2003 | |
| JP | 2003-156144 | A | 5/2003 | |
| JP | 2003148608 | A * | 5/2003 | |
| JP | 2004-92851 | A | 3/2004 | |
| JP | 2004-308752 | A | 11/2004 | |
| JP | 2007-107673 | A | 4/2007 | |
| JP | 2012-90462 | A | 5/2012 | |
| JP | 2015-81665 | A | 4/2015 | |

OTHER PUBLICATIONS

Machine translation of JP 2003-148608 (Year: 2003).*
Machine translation of JP 7-190187 (Year: 1995).*
Machine translation of JPH07190187, Toshiharu (Year: 1995).*
Machine translation of JP-2003148608, Hiroyuki (Year: 2003).*
Chinese Office Action issued in counterpart Chinese Application No. 201480055552.0 dated Aug. 30, 2016, with English translation (twelve (12) pages).
Japanese Office Action issued in counterpart Japanese Application No. 2013-220969 dated Feb. 7, 2017, with English translation (five (5) pages).
International Search Report (PCT/ISA/210) issued in PCT Application No. PCT/JP2014/074947 dated Dec. 22, 2014 with English-language translation (four (4) pages).
Japanese-language Written Opinion (PCT/ISA/237) issued in PCT Application No. PCT/JP2014/074947 dated Dec. 22, 2014 (four (4) pages).
Japanese Reply to Written Opinion issued in PCT Application No. PCT/JP2014/074947 dated Aug. 24, 2015 with English-language translation (eleven (11) pages).
International Preliminary Report on Patentability (PCT/IPEA/409) including annexes issued in PCT Application No. PCT/JP2014/074947 dated Nov. 9, 2015 with partial English-language translation (seventeen (17) pages).
International Preliminary Report on Patentability (PCT/IB/338 and PCT/IPEA/409) issued in PCT Application No. PCT/JP2014/074947 dated Apr. 28, 2016 (five (5) pages).
Extended European Search Report issued in counterpart European Application No. 14855392.8 dated Jul. 28, 2017 (Nine (9) pages).

* cited by examiner

FIG. 9C

RANGE SWITCHING DEVICE FOR AUTOMATIC TRANSMISSION AND SWITCHING METHOD THEREFOR

TECHNICAL FIELD

The present invention relates to a range switching device for switching a range of an automatic transmission by using an actuator electrically controlled to be driven, and a switching method thereof.

BACKGROUND ART

A known conventional range switching device switches a range of an automatic transmission by driving an actuator in response to a shifting operation by a driver (see, for example, Patent Document 1). Patent Document 1 discloses a technique for learning a control target position of each range. In this technique, in a state positioned by a detent mechanism, a target angle in a current range is learned based on an angle of a range switching shaft (angle of a bottom position) detected by a potentiometer.

Patent Document 2 describes a shift control system for correcting an output value of an encoder to an absolute position by bringing a detent plate and a roller of a detent spring into contact with each other, detecting a contact position thereof, and learning a limit position (wall position) of an operation range as a reference value. In Patent Document 2, feedback control is performed by using a deviation between a current position of an output shaft angle and a target position.

REFERENCE DOCUMENT LIST

Patent Documents

Patent Document 1: Japanese Patent Application Laid-open Publication No. 2004-092851
Patent Document 2: Japanese Patent Application Laid-open Publication No. 2004-308752

SUMMARY OF THE INVENTION

Problems to be Solved by the Invention

In a range switching device and a shift control system of these types, a control constant of an electric actuator is applied while focusing on shifting responsiveness in general.

In this configuration, however, since the detent mechanism performs positioning by pressing the roller with the detent spring against the detent plate having a groove corresponding to a range, when the roller moves into the groove corresponding to the range and falls on a bottom position of the groove across a top thereof, a repulsive force of the detent spring is applied, and collision noise occurs when the roller reaches a target bottom position. Thus, in application to a vehicle that is extremely quiet, such as an electric vehicle (EV), this mechanism becomes a noise source, thus impairing marketability.

The present invention has been made in view of the foregoing problems, and has an object of providing a range switching device and a switching method for an automatic transmission that can reduce collision noise caused by a detent mechanism.

Means for Solving the Problems

A range switching device of an automatic transmission according to the present invention is used for the automatic transmission including a detent mechanism that presses a roller against a groove by using a spring, moves the roller between grooves, and determines a range position of the transmission that is changed by driving the detent mechanism by an actuator, and in changing the range position of the transmission, the actuator is braked in accordance with a drawing force of the spring into a groove by calculating a braking force by control focusing on responsiveness, calculating a braking force corresponding to a drawing force of the spring to a bottom position in a groove, and adding the calculated braking force so that the actuator is driven to rotate reversely based on a result of the addition.

A range switching device of an automatic transmission according to the present invention is used for the automatic transmission including a detent mechanism that presses a roller against a groove by using a spring, moves the roller between grooves, and determines a range position of the transmission that is changed by driving the detent mechanism by an actuator, wherein the detent mechanism is driven by the actuator, the actuator is braked in accordance with a drawing force of the spring into a groove, and the actuator is braked by obtaining a driving speed of the actuator, estimating a speed of the roller when the roller reaches a target bottom position in a case in which a maximum braking force is applied to the actuator at a current output shaft angle, and applying the maximum braking force to the actuator when the estimated speed satisfies a condition.

A range switching method for an automatic transmission according to the present invention is used for the automatic transmission including a detent mechanism that presses a roller against a groove by using a spring, moves the roller between grooves, and determines a range position of the transmission that is changed by driving the detent mechanism by an actuator, and the method includes: driving the detent mechanism by the actuator; and braking the actuator in accordance with a drawing force of the spring into a groove, wherein the driving the actuator is driving the actuator so that the actuator rotates reversely, and the driving the actuator so that the actuator rotates reversely includes calculating a braking force by control focusing on responsiveness, calculating a braking force corresponding to a drawing force of the spring to a bottom position in a groove, and adding the calculated braking force, and the actuator is driven to rotate reversely based on a result of the addition.

A range switching method for an automatic transmission according to the present invention is used for the automatic transmission including a detent mechanism that presses a roller against a groove by using a spring, moves the roller between grooves, and determines a range position of the transmission that is changed by driving the detent mechanism by an actuator, and the method includes: driving the detent mechanism by the actuator; and braking the actuator in accordance with a drawing force of the spring into a groove, wherein the braking the actuator includes obtaining a driving speed of the actuator, and estimating a speed of the roller when the roller reaches a target bottom position in a case in which a maximum braking force is applied to the actuator at a current output shaft angle, and the maximum braking force is applied to the actuator when the estimated speed satisfies a condition.

Effects of the Invention

According to the present invention, in changing the range position of the transmission, the actuator is braked in accordance with the drawing force of the spring into the groove so that energy of the velocity can be controlled to approach zero when the roller reaches a target stop position. Thus, collision noise occurring when the roller collides with a groove of a detent plate can be reduced.

MODE FOR CARRYING OUT THE INVENTION

An embodiment of the present invention will be described with reference to the drawings.

Figure 1:
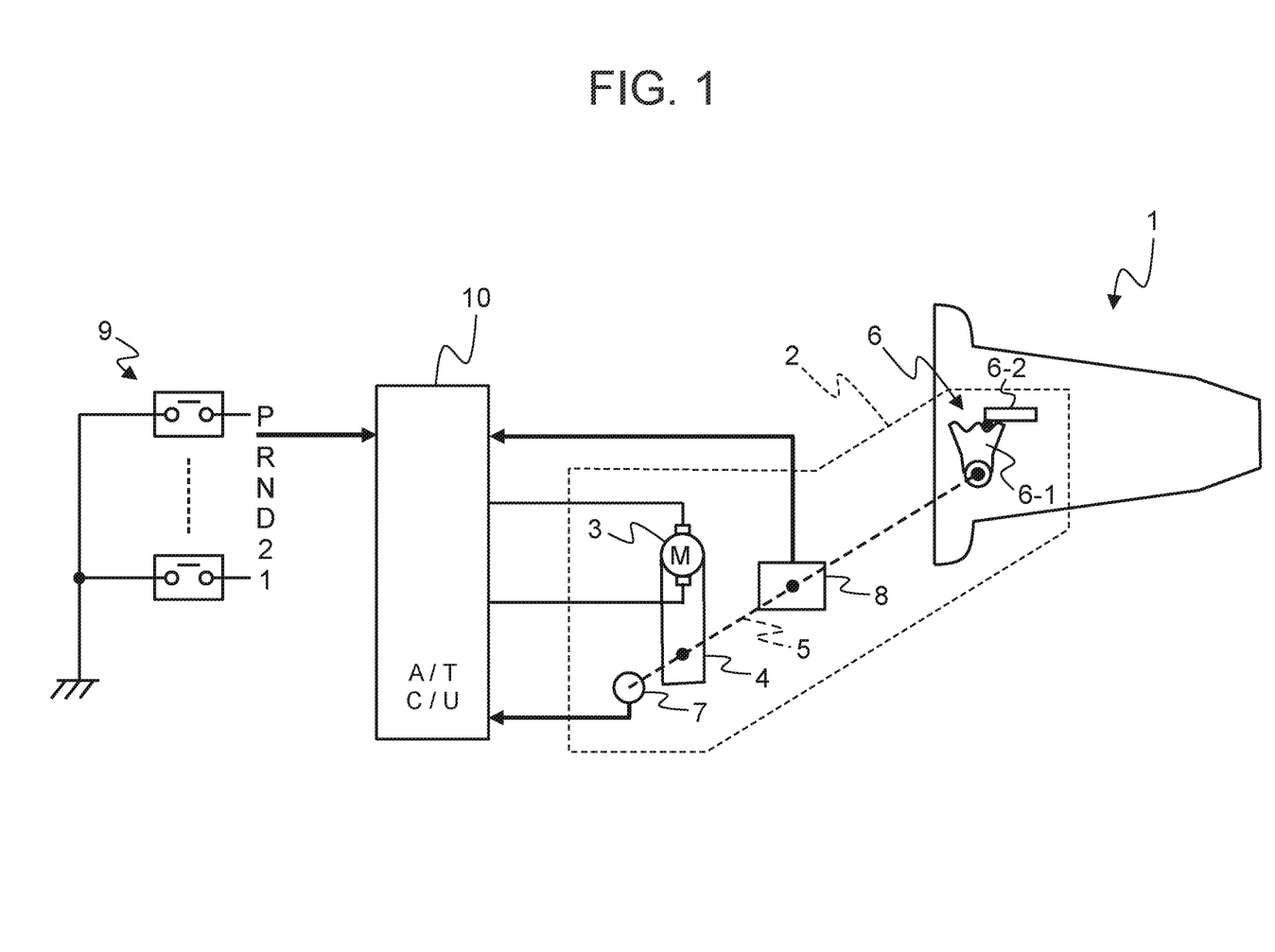
FIG. 1 is a system configuration diagram illustrating a range switching device of an automatic transmission according to an embodiment of the present invention.

In a range switching device of an automatic transmission illustrated in FIG. 1, an automatic transmission 1 to be installed in a vehicle includes an actuator (motor) 3 for park by wire (PBW) to drive a range switching valve. Actuator 3 sets the vehicle in a parking lock state by a shifting operation of a driver, e.g., shifting from not-parking (NotP range) such as a D range to parking (P range), or sets the vehicle in a movable state by a shifting operation from the P range to the NotP range. That is, actuator 3 mechanically locks or unlocks a transmission or a reduction gear.

The output shaft of actuator 3 is provided with a deceleration gear mechanism 4, and actuator 3 rotatably drives a range switching shaft 5 through deceleration gear mechanism 4. Range switching shaft 5 is provided with a detent mechanism 6, a potentiometer 7, and an inhibitor switch 8, for example. Detent mechanism 6 positions range switching shaft 5 at angles respectively corresponding to the P range and the NotP range. Potentiometer 7 successively detects the angles of range switching shaft 5, and inhibitor switch 8 detects which one of the P range or the NotP range automatic transmission 1 is switched to.

In addition, a range switching switch 9 for outputting range position signals respectively corresponding to range positions P, R, N, D, 2, and 1 when the driver performs a shifting operation is also provided.

A signal output from potentiometer 7 and corresponding to a rotation angle of range switching shaft 5, a signal output from inhibitor switch 8 and indicating which one of the P range or the NotP range automatic transmission 1 is switched to, and a range position signal output from range switching switch 9 are input to an NT control unit (A/T C/U) 10. In response to a range switching request determined based on a range position signal of range switching switch 9, NT control unit 10 controls actuator 3 so that actuator 3 drives.

Specifically, proportional-integral (PI) control is performed in accordance with a deviation between a target angle of range switching shaft 5 required by range switching switch 9 and an actual angle detected by potentiometer 7 (output shaft angle sensor) 7, and a driving signal (duty driving signal for turning power supply on or off at high frequency) is supplied to actuator 3 to perform feedback control.

Figure 2:
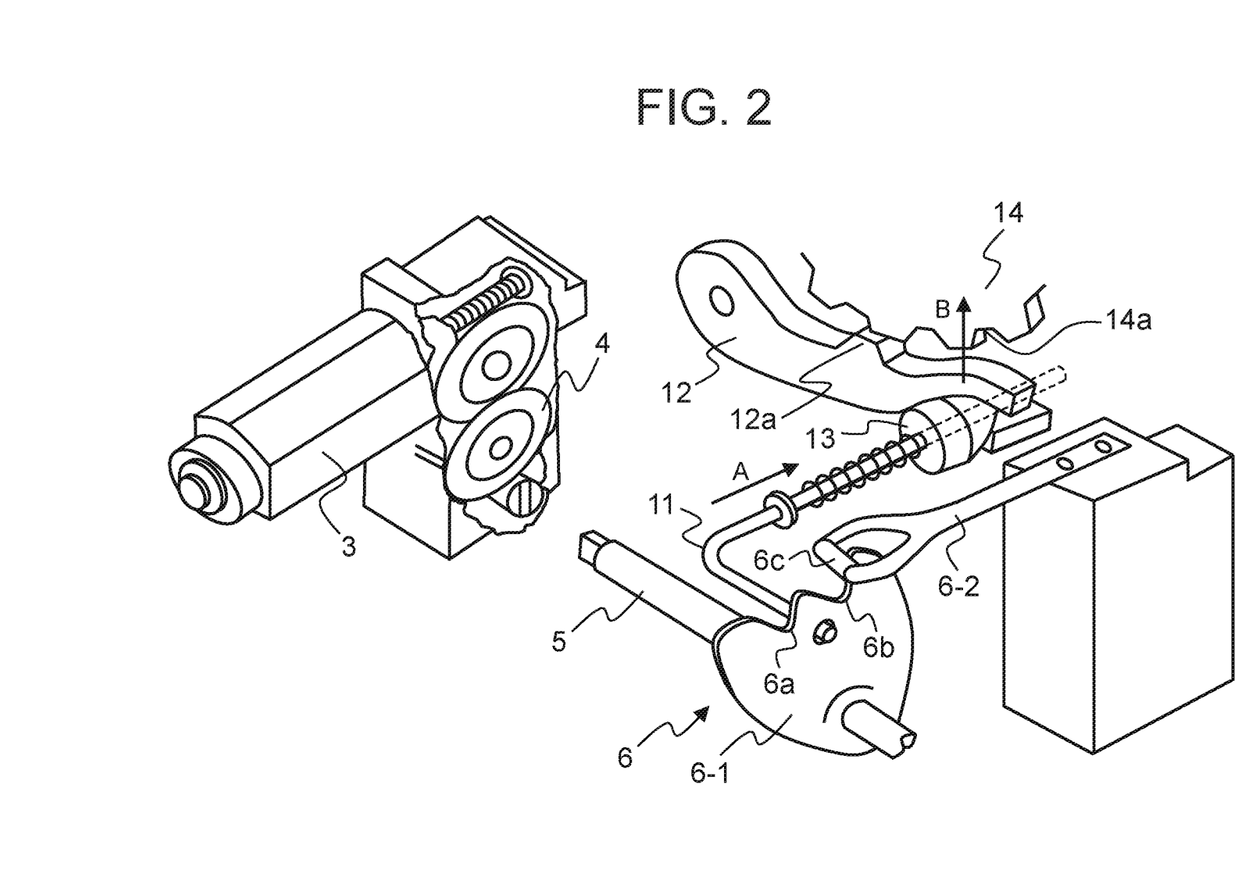
FIG. 2 is a perspective view illustrating an example configuration of a region enclosed by a broken line in FIG. 1.

FIG. 2 illustrates an example configuration of a region 2 enclosed by a broken line in FIG. 1. Detent mechanism 6 includes a detent plate 6-1 that is fixed to range switching shaft 5 and configured to rotate integrally with range switching shaft 5 and a detent spring (spring) 6-2 that supports a roller 6c engaged with grooves 6a and 6b corresponding to the P range and the NotP range and formed in a peripheral portion of detent plate 6-1 and biases roller 6c toward the bottom positions of grooves 6a and 6b under pressure. Detent mechanism 6 positions range switching shaft 5 at an angle corresponding to one of the P range or the NotP range.

Detent plate 6-1 is attached to one end of an L-shaped rod 11, and a cam 13 is attached to the other end of rod 11. A parking pawl 12 is swingably supported and is driven to swing while being in slidable contact with cam 13. When a shifting operation from the NotP range to the P range is performed, roller 6c moves from groove 6b to groove 6a and becomes engaged with groove 6a. At this time, rod 11 is pressed in the direction of an arrow A, and a tapered portion of cam 13 pushes parking pawl 12 upward in the direction of an arrow B so that a projection 12a of parking pawl 12 becomes engaged with a recess 14a of a parking gear 14 and, thereby, parking gear 14 is fixed.

Figure 3A:
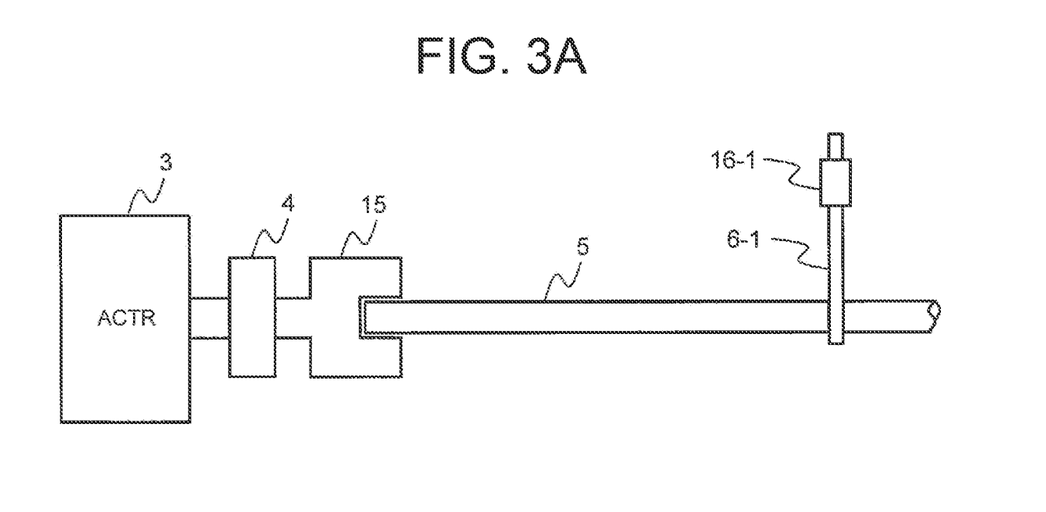
FIGS. 3A and 3B illustrate an extracted power transmission path from an actuator to a detent mechanism in FIG. 2.
Figure 3B:
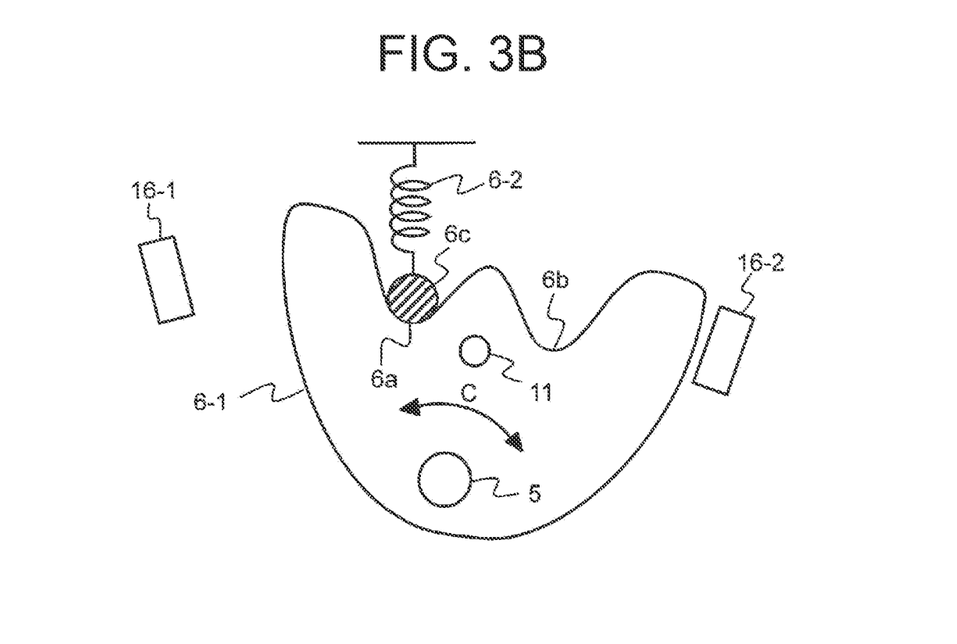

FIGS. 3A and 3B illustrates an extracted power transmission path from actuator 3 to detent mechanism 6 in FIG. 2, FIG. 3A is a front view, and FIG. 3B is a side view seen from the detent plate in FIG. 3A. A driving force of actuator (ACTR) 3 is transmitted to range switching shaft 5 by a spline 15, and range switching shaft 5 rotates to cause detent plate 6-1 to rotate in the direction of an arrow C. In this manner, roller 6c reciprocates between groove 6a formed in detent plate 6-1 and corresponding to the P range and groove 6b formed in detent plate 6-1 and corresponding to the NotP range. Here, roller 6c is biased under pressure toward the bottom positions of grooves 6a and 6b by detent spring 6-2. When the range is switched from the P range to the NotP range, for example, roller 6c moves from groove 6a to groove 6b across the top.

A predetermined amount of play is provided in a rotation direction in a portion where spline 15 and range switching shaft 5 are coupled to each other. Stoppers 16-1 and 16-2 for restricting rotation of detent plate 6-1 are provided at both sides of detent plate 6-1.

First Control Example

Figure 4A:
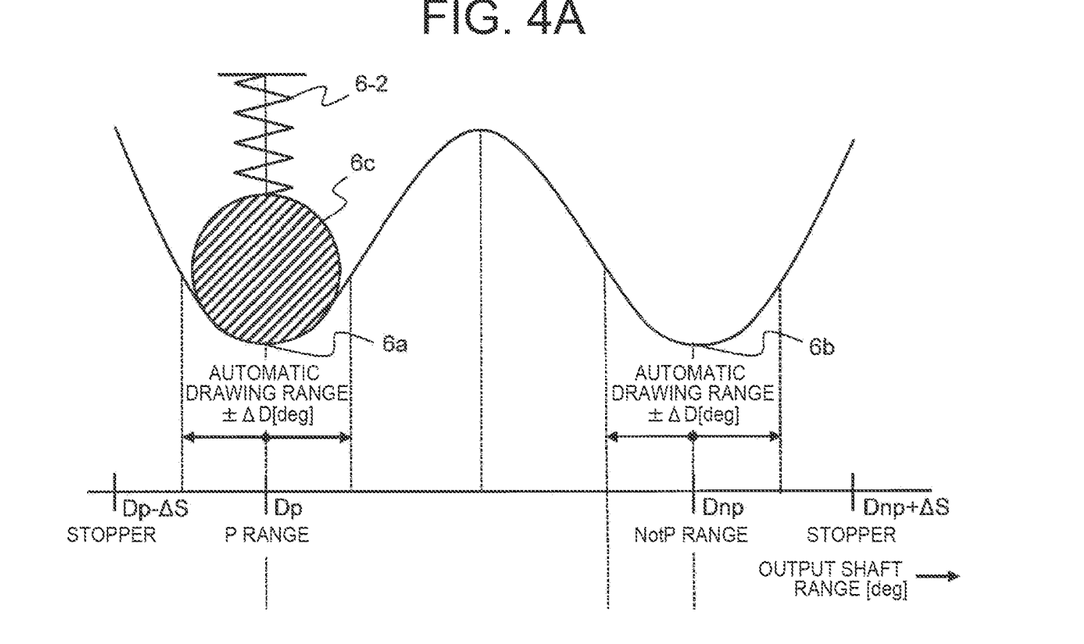
FIGS. 4A to 4C illustrate a first control example of an actuator in the range switching device of the automatic transmission according to the embodiment of the present invention.

Control of actuator 3 in the range switching device having the configuration described above will be specifically described with reference to FIGS. 4A to 4C. FIG. 4A schematically illustrates a contact portion between roller 6c and detent plate 6-1. In this example, a shifting operation from the P range to the NotP range is performed. Roller 6c is biased downward by detent spring 6-2 toward the lower limit position (bottom position) of groove 6a under pressure. Suppose an angle (output shaft angle) of range switching shaft 5 is Dp [deg] when roller 6c is at the bottom position of groove 6a corresponding to the P range, as long as the angle is within ±ΔD [deg], pressing by detent spring 6-2 causes roller 6c to be automatically drawn to the bottom position of groove 6a in detent plate 6-1 even when driving of actuator 3 is stopped (automatic drawing range).

The output shaft angle of the lower limit position (bottom position) of groove 6b corresponding to the NotP range is at Dnp [deg], for example, this bottom position is set as a control target position (target stop position), and control is performed so that the speed, that is, energy of the velocity, of roller 6c is zero when the output shaft angle is Dnp [deg]. In a manner similar to the P range, the NotP range has an automatic drawing range of ±ΔD [deg].

The output shaft angle of stopper 16-1 is Dp−ΔS [deg], and the output shaft angle of stopper 16-2 is Dnp+ΔS [deg].

Figure 4B:
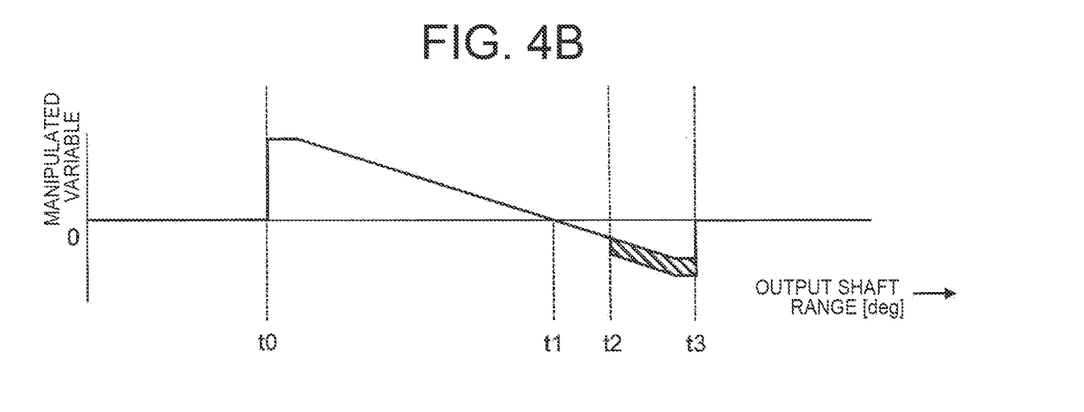
Figure 4C:
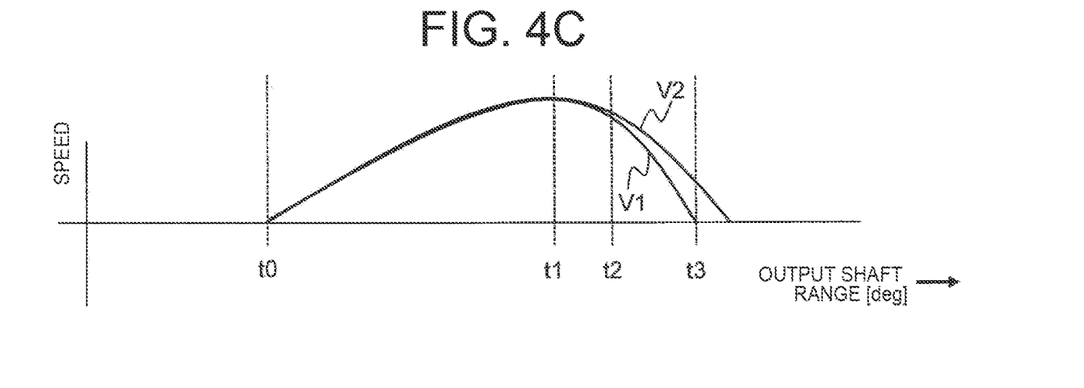

When the driver performs a shifting operation from the P range to the D range (NotP range), as illustrated in FIG. 4B, a manipulated variable of actuator 3 rapidly increases (at time t0), and gradually decreases with movement of roller 6c. As this control, PI control is employed, and a control constant focusing on responsiveness of the actuator is applied. When roller 6c moves across the top and descends toward the bottom of groove 6b, actuator 3 is braked at time t1, for example. Subsequently, when roller 6c reaches the automatic drawing range (at time t2), a braking force corresponding to a hatched region between times t2 and t3 is added to the manipulated variable in consideration of a drawing force of detent spring 6-2.

That is, the greatest force is needed when roller 6c moves out of the bottom position, and a driving force is then gradually reduced. Thereafter, when the driving force is reduced to some degree at time t1, actuator 3 is driven to be reversed and is braked. At this time, in consideration of a repulsive force of detent spring 6-2, a force of drawing by detent spring 6-2 is added to the braking force from a midpoint (time t2).

As a timing of braking, for example, the driving speed of actuator 3 is obtained (calculated from the amount of change of the output shaft angle), the speed of roller 6c when roller 6c reaches a target bottom position with a maximum braking force being applied to actuator 3 at a current output shaft angle is estimated, and when the estimated speed satisfies a condition, the maximum braking force is applied to actuator 3. The condition is that the speed of roller 6c when roller 6c reaches a target bottom position (output shaft angle=Dnp [deg]) is substantially zero or that the speed of roller 6c when roller 6c reaches the target bottom position becomes zero and then changes to a positive value.

Since the driving force and the braking force of actuator 3 change depending on a power supply voltage and a temperature of actuator 3, movement of roller 6c changes. Thus, the estimated speed of roller 6c when roller 6c reaches the target bottom position is corrected in accordance with the power supply voltage and the temperature of actuator 3. Specifically, when the power supply voltage of actuator 3 is high, the braking force is increased, whereas when the power supply voltage is low, the braking force is reduced. In addition, when the temperature of actuator 3 is high, the braking force is increased, whereas when the temperature is low, the braking force is reduced. In this manner, the braking force is corrected in consideration of variations depending on the power supply voltage and the temperature of actuator 3.

In detent mechanism 6, the configuration of detent plate 6-1 and a repulsive force of detent spring 6-2 cause the repulsive force of detent spring 6-2 to act strongly when roller 6c enters the automatic drawing range.

In view of this, in the first control example, in addition to PI control focusing on responsiveness, a drawing force to the bottom position in the groove by detent spring 6-2 is added to the braking force. In this manner, the braking force is increased in accordance with the force of drawing roller 6c to bottom position of groove 6b so that the speed of roller 6c when roller 6c reaches the target bottom position substantially approaches zero, as illustrated by a solid line V1 in FIG. 4C, and stops at bottom position of groove 6b quietly. The braking force is corrected in consideration of variations depending on the power supply voltage and the temperature of actuator 3 so that the braking force can be more accurately controlled.

If the repulsive force of detent spring 6-2 were not taken into consideration, the energy of the velocity would remain when roller 6c reaches the target bottom position as illustrated in a solid line V2, and thus, collision noise would occur.

Figure 5:
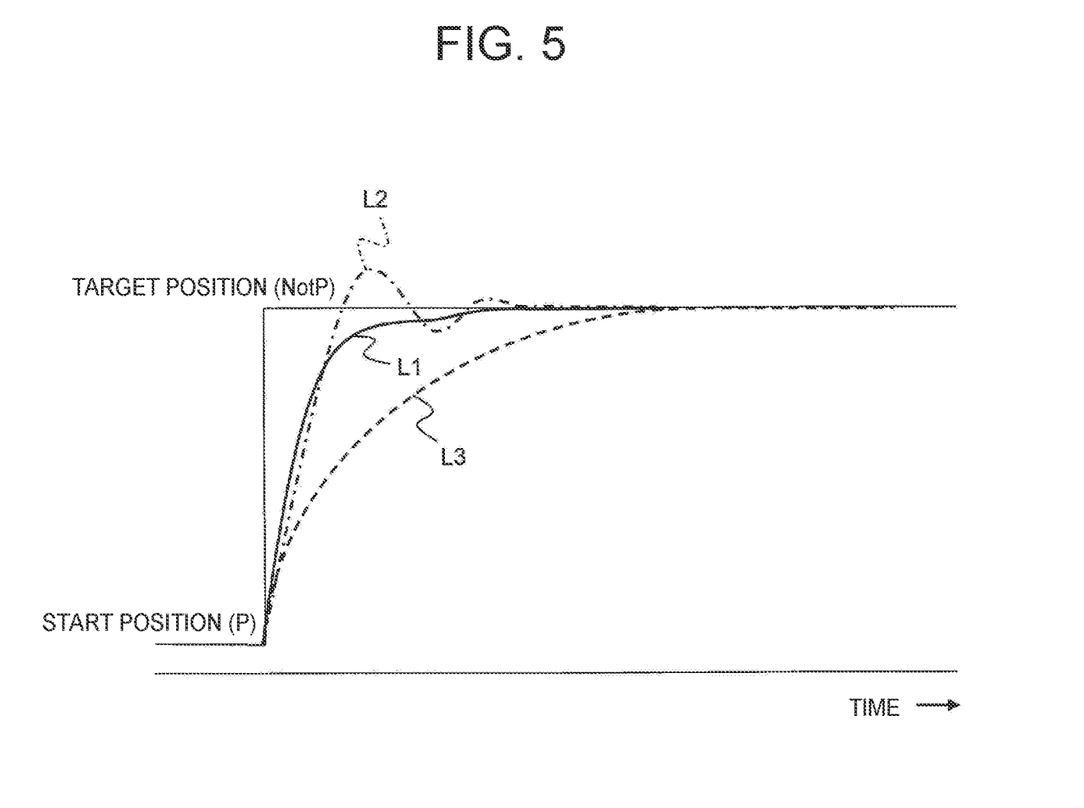
FIG. 5 is a characteristic diagram demonstrating a relationship between an output shaft angle and a response time.

FIG. 5 shows a relationship between an output shaft angle and a response time when a shifting operation from the P range to the D range is performed. In FIG. 5, a solid line L1 corresponds to the embodiment, a dash-dot line L2 corresponds to a case in which a control constant is applied while focusing on shifting responsiveness, and a broken line L3 corresponds to a case in which a control constant is applied while focusing on quietness, in the relationship between the output shaft angle and the response time. In the case of focusing on shifting responsiveness, as indicated by dash-dot line L2, the target position (NotP range) is overshot and then change of the output shaft angle is converged in a relatively short period. However, collision noise occurs at overshooting. On the other hand, in PI control focusing on quietness, as indicated by broken line L3, the output shaft angle gently changes and collision noise is less likely to occur, but the response time is long.

On the other hand, as illustrated in solid line L1, after roller 6c has moved across the top, actuator 3 is braked in consideration of a drawing force into groove 6b by detent spring 6-2 so that the output shaft angle is caused to change gently to suppress generation of collision noise and an increase of the response time can be reduced. In this manner, both quietness and responsiveness can be achieved.

Figure 6A:
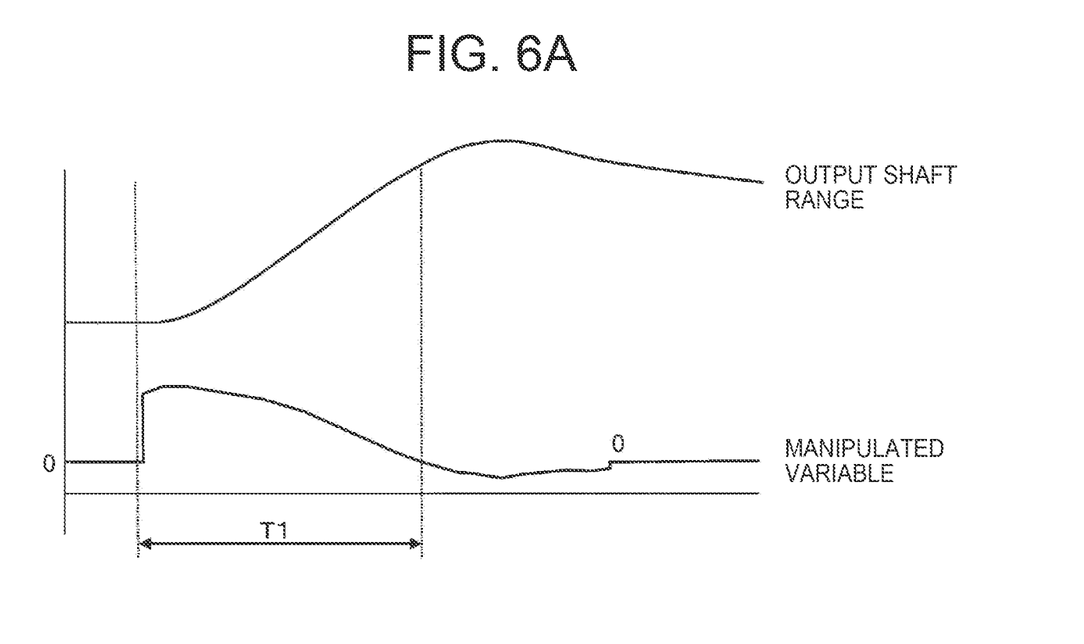
FIGS. 6A and 6B are characteristic diagrams demonstrating measurement results of output shaft angles and manipulated variables in a conventional range switching device of an automatic transmission and the range switching device of the automatic transmission according to the embodiment of the present invention in comparison.
Figure 6B:
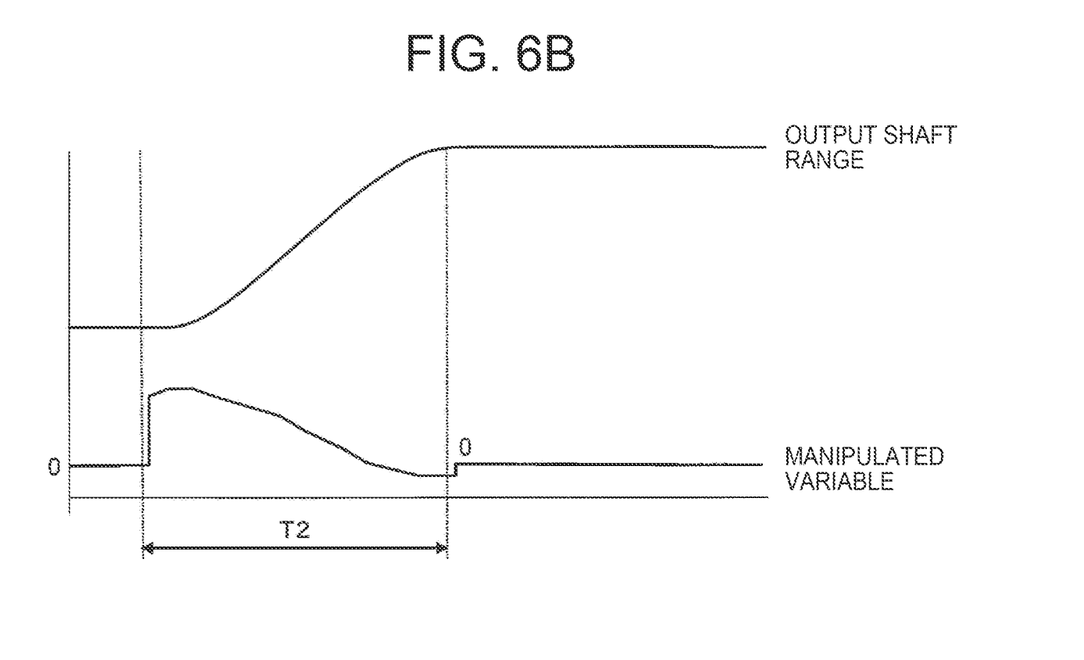

FIGS. 6A and 6B illustrate a relationship between an output shaft angle and a manipulated variable with a comparison of measurement results between a (conventional) case in which a control constant is applied while focusing on shifting responsiveness and the first control example of the embodiment of the present invention. As illustrated in FIG. 6A, in the conventional example, although time T1 of 100% response is short, overshooting then occurs in the output shaft angle, and an operation is performed after a lapse of time T1 of 100% response. After a lapse of a predetermined time, the manipulated variable becomes zero.

On the other hand, as illustrated in FIG. 6B, in this embodiment, although a time T2 of 100% response is relatively long, no overshooting occurs in the output shaft angle, and the manipulated variable is substantially zero after a lapse of time T2 of 100% response.

Modifications

Figure 7A:
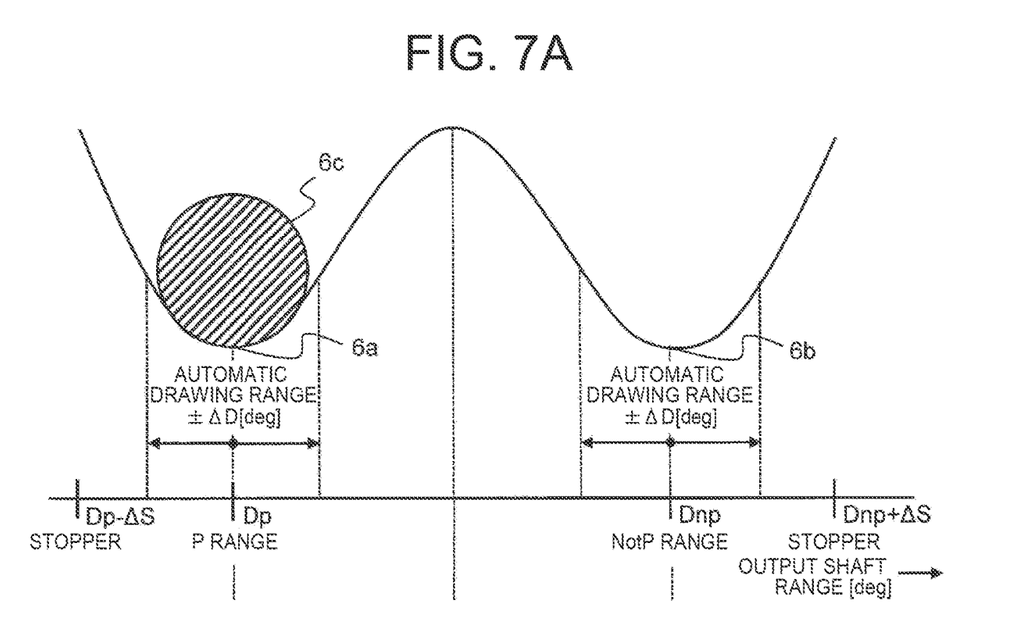
FIGS. 7A and 7B schematically illustrate a relationship between a detent plate and a roller in a case in which a control target position is before a lower limit position of a groove.
Figure 7B:
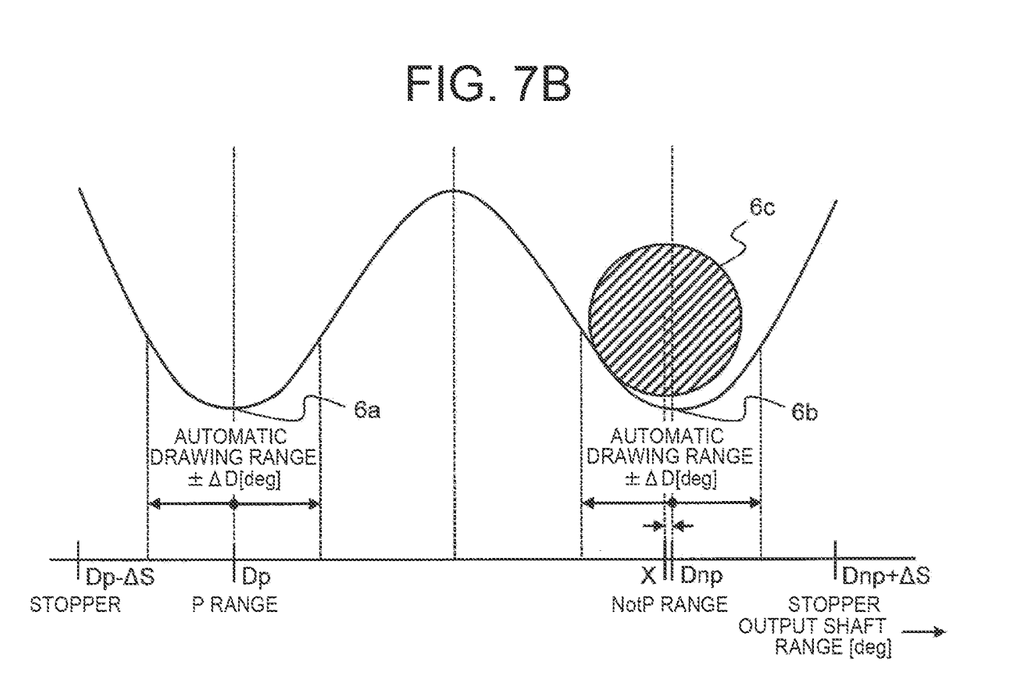
Figure 8A:
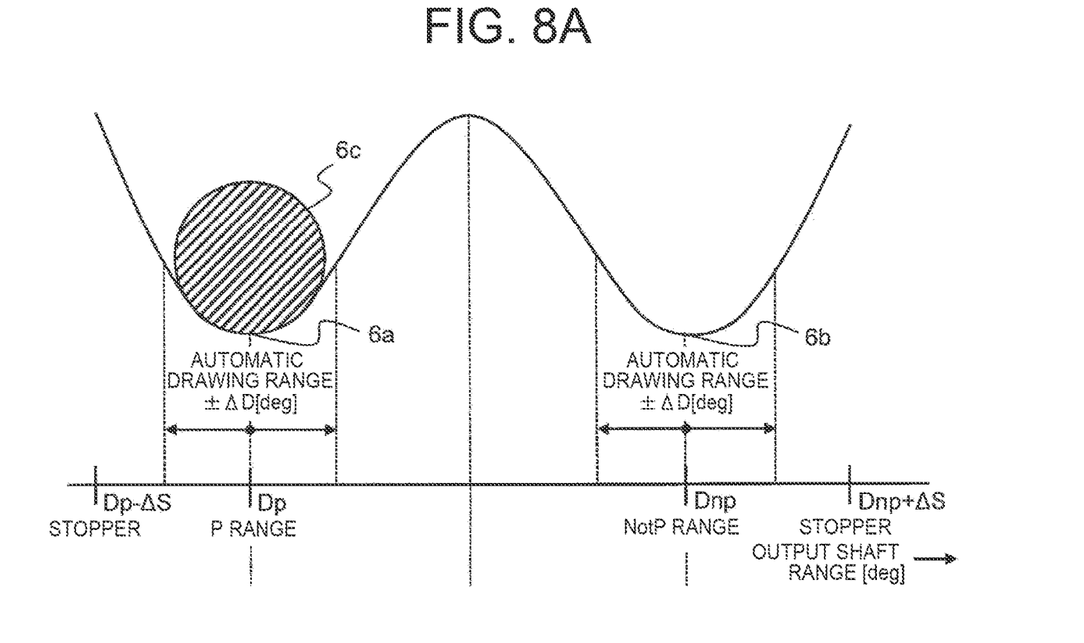
FIGS. 8A and 8B schematically illustrate a relationship between the detent plate and the roller in a case in which the control target position is a previous stop position.
Figure 8B:
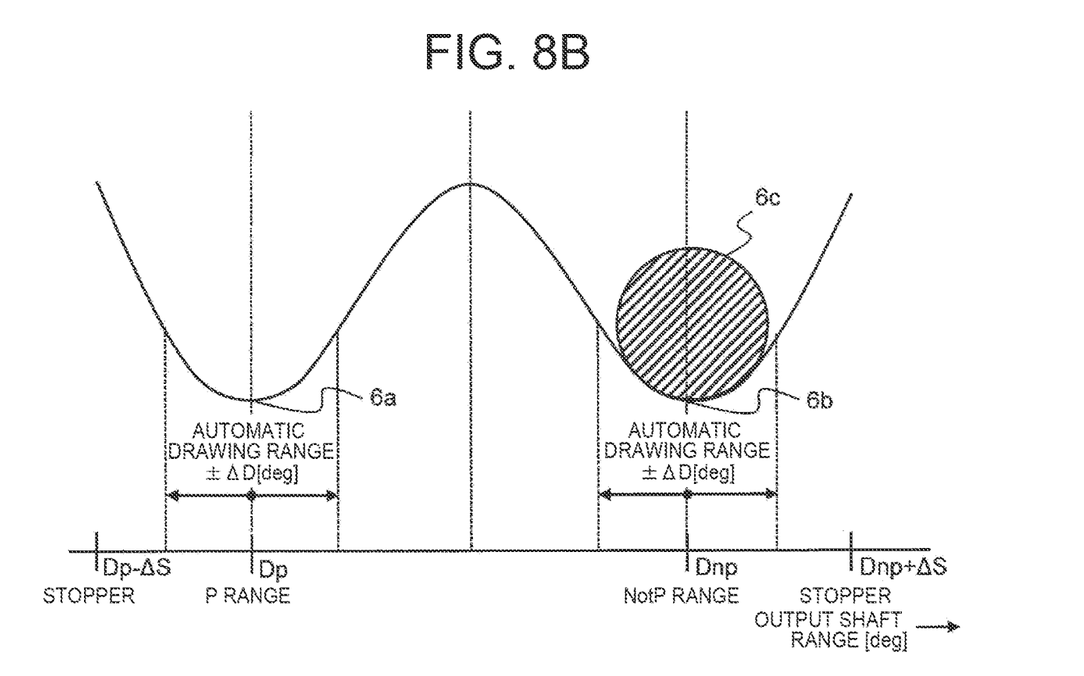

In the first control example described above, the control target position (target stop position) is the lower limit position (bottom position) of the groove. FIGS. 7A, 7B, 8A and 8B respectively illustrate modifications with different control target positions. Here, an example in which a shifting operation from the P range to the NotP range will be described. Each of FIGS. 7A and 8A schematically shows a state before the shifting operation, and each of FIGS. 7B and 8B shows a control target position after the shifting operation.

In FIGS. 7A and 7B, the control target position is slightly before (within the automatic drawing range) of the bottom position of groove 6b corresponding to the NotP range. That is, suppose the output shaft angle of the bottom position of groove 6a corresponding to P range is Dp [deg], control is performed in such a manner that the speed of roller 6c in a state in which the control target position is at the output shaft angle (Dnp [deg]–X) is substantially zero. Here, a relationship of "X<ΔD [deg]" is established. From the position at which roller 6c stops to the bottom position, automatic drawing is performed by a repulsive force of detent spring 6-2.

In a case in which control is performed in such a manner that the speed, that is, energy of the velocity, of roller 6c is substantially zero before the bottom position of the NotP range, roller 6c can be moved to the bottom position of groove 6b quietly by using automatic drawing by the repulsive force of detent spring 6-2, thereby reducing collision noise occurring when detent mechanism 6 moves to groove 6b.

FIGS. 8A and 8B illustrate another variation in which the control target position is set at a previous stop position. Specifically, the timing of switching from driving to braking of actuator 3 and a set value of a braking force are learned, and next control is performed based on the learned set value. The braking force is learned from a previous switching timing from driving to braking, a previous stop position, the speed of roller 6c when roller 6c reaches the target bottom position, and the amount (angle) of overshooting from the target bottom position, for example. This learned value can be stored using, as a parameter, at least one of a power supply voltage of actuator 3 or the temperature of actuator 3. Control is performed in such a manner that the speed, or energy of the velocity, of roller 6c when roller 6c reaches the control target position is substantially zero.

Since there is provided play due to backlash of spline 15, even when roller 6c has stopped at the bottom position of groove 6b, the output shaft angle might fail to be precisely Dnp [deg], and thus, a position where roller 6c actually previously stopped is set as a target.

In this manner, play provided in the power transmission path from actuator 3 to detent mechanism 6 and an influence of, for example, abrasion due to aging can be reduced so that precision can be enhanced.

Second Control Example

Figure 9A:
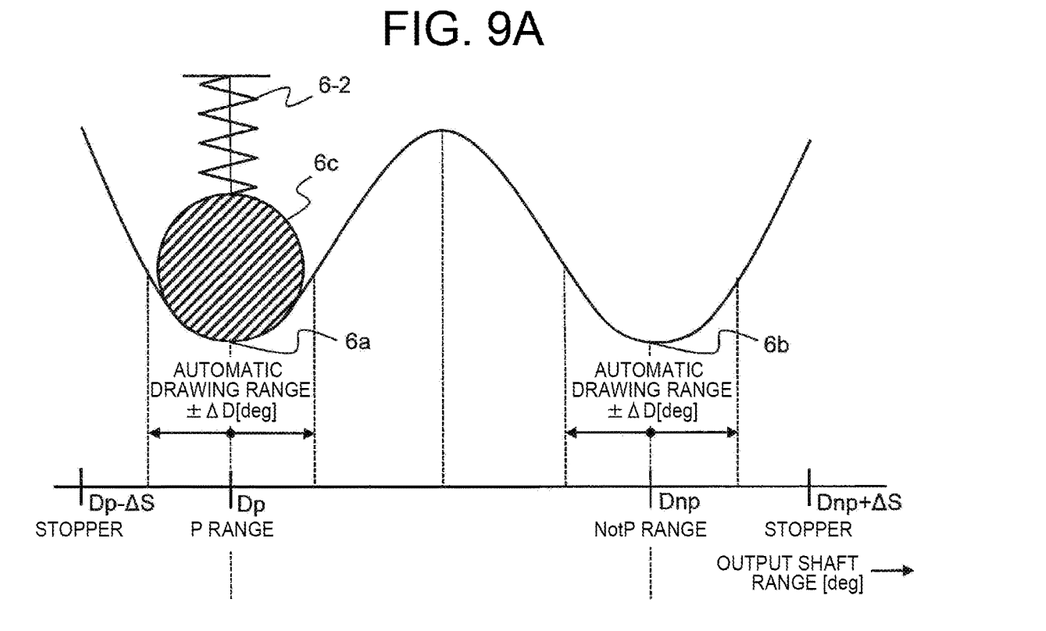
FIGS. 9A to 9C illustrate a second control example of the actuator in the range switching device of the automatic transmission according to the embodiment of the present invention.
Figure 9B:
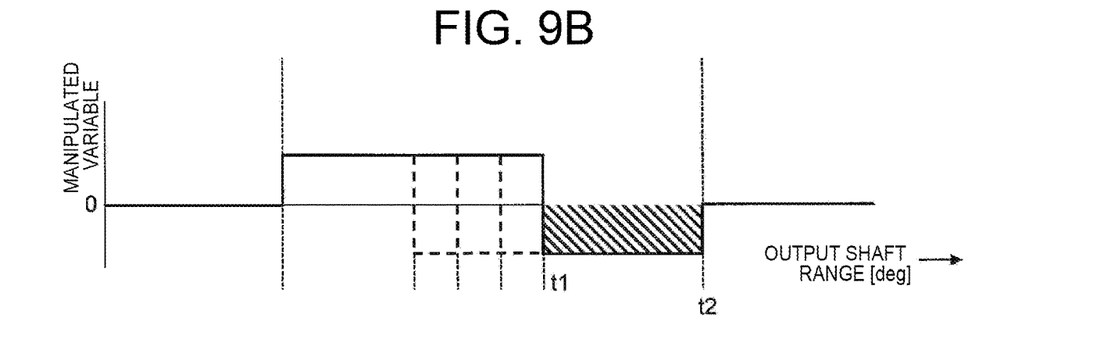
Figure 9C:
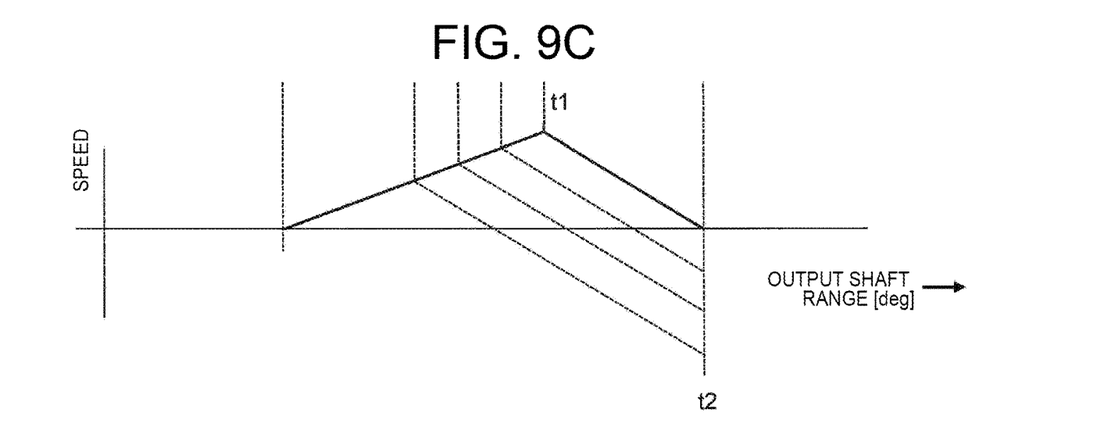

In a second control example of actuator 3 illustrated in FIGS. 9A and 9B, maximum driving is performed on actuator 3, and then maximum braking is performed on actuator 3. FIG. 9A schematically illustrates a contact portion where roller 6c and detent plate 6-1 are in contact with each other. In this case, in a manner similar to FIG. 4A, a shifting operation from the P range to the NotP range is performed. Roller 6c is biased by detent spring 6-2 toward the bottom positions of grooves 6a and 6b under pressure.

Suppose the angle (output shaft angle) of range switching shaft 5 is Dp [deg] when roller 6c is at the bottom position of groove 6a corresponding to the P range, roller 6c is automatically drawn to the bottom position of groove 6a of detent plate 6-1 by pressing by detent spring 6-2 as long as the angle is within ±ΔD [deg] (automatic drawing range).

The bottom position of groove 6b corresponding to the NotP range is, for example, at an output shaft angle of Dnp [deg] and has an automatic drawing range of ±ΔD [deg] in a manner similar to the P range. Stopper 16-1 is disposed at an output shaft angle of Dp–ΔS [deg], and stopper 16-2 is disposed at an output shaft angle of Dnp+ΔS [deg].

When the driver performs a shifting operation from the P range to the D range (NotP range), the manipulated variable of actuator 3 rapidly increases as illustrated in FIG. 9B, and maximum driving is then performed on actuator 3. Then, from the change in speed, the speed of roller 6c when roller 6c reaches a target position (time t1) is estimated, and an output shaft angle at the start of braking is determined in accordance with the estimated speed. When roller 6c reaches the output shaft angle at the start of braking (time t2), maximum braking is performed so that roller 6c stops at the target position. At this time, a deceleration degree for use in estimating the speed is changed (corrected) in accordance with the temperature of actuator 3. Thereafter, actuator 3 is reversely driven (braked) in such a manner the speed, that is, energy of the velocity, of roller 6c when roller 6c reaches the target position is substantially zero. In the case of FIGS. 9A and 9B, the control target position is time t2. Alternatively, the control target position may be before the lower limit of the bottom of the NotP range (within automatic drawing range) as in the variation described above or may be at a previous stop position.

In the second control example, the response time can be reduced with suppressed occurrence of collision noise.

In the first and second control examples and the variation described above, the vehicle starts in a stopped state in which collision noise is easily heard, that is, the shifting operation from the P range to the NotP range is performed. For a vehicle having high quietness, such as an EV, similar control can be, of course, performed in the case of performing a shifting operation from the NotP range to the P range.

REFERENCE SYMBOL LIST 1 automatic transmission
3 actuator (motor)
6 detent mechanism
6-1 detent plate
6-2 detent spring (spring)
6a, 6b groove
6c roller

The invention claimed is:

1. A range switching device comprising:
a detent mechanism that presses a roller against a groove by using a spring, moves the roller between grooves, and determines a position range of an automatic transmission;
an actuator configured to change the position range of the automatic transmission by driving the detent mechanism; and
a control unit that is configured to rotate the actuator to drive the detent mechanism in a direction to move the roller, and to rotate the actuator in a direction reverse to the driving direction to stop the roller,
wherein the control unit is configured to rotate the actuator to stop the roller by calculating a first braking force corresponding to a proportional-integral (PI) control related to shifting responsiveness and a second braking force corresponding to a force with which the spring presses the roller to a bottom position in a groove, and the actuator is rotated based on a third braking force which is a sum of the first braking force and the second braking force, and when the control unit causes braking of the actuator by rotating the actuator to stop the roller, the control unit:
calculates a driving speed of the detent mechanism based on an amount of change of an output shaft angle of the actuator,
estimates a speed of the roller attained when the roller reaches a target bottom position in a case in which the actuator is rotated based on a maximum braking force at the output shaft angle, and
rotates the actuator based on the maximum braking force when the estimated speed satisfies a condition.

2. The range switching device of claim 1, wherein braking of the actuator is stopped at least at one of a lower limit position of the groove, a position before the lower limit position of the groove and within a range of automatic drawing by the spring, and a previous stop position.

3. The range switching device of claim 1, wherein the control unit sets a timing of switching from driving to braking of the actuator based on a maximum braking force of the actuator.

4. The range switching device of claim 1, wherein the control unit changes at least one of a timing of switching from driving to braking of the actuator and the third braking force of the actuator in accordance with at least one of a power supply voltage applied to the actuator and a temperature of the actuator.

5. The range switching device of claim 4, wherein the control unit increases the third braking force when the power supply voltage of the actuator increases, and the control unit reduces the third braking force when the power supply voltage of the actuator decreases.

6. The range switching device of claim 4, wherein the control unit increases the third braking force when the temperature of the actuator increases, and the control unit reduces the third braking force when the temperature of the actuator decreases.

7. The range switching device of claim 1, wherein the control unit learns a timing of switching from driving to braking of the actuator and a set value of the third braking force, and controls the actuator based on the learned set value.

8. The range switching device of claim 7, wherein the control unit learns the set value of the third braking force from at least one of: one of a previous timing of switching from driving to braking and a previous stop position; a speed of the roller when the roller reaches a target bottom position; and an amount of overshooting from the target bottom position.

9. A method comprising:
pressing a roller, using a detent mechanism, against a groove by using a spring, moving the roller between grooves, and determining a position range of an automatic transmission;
changing, using an actuator, the position range of the automatic transmission by driving the detent mechanism;
rotating, using a control unit, the actuator to drive the detent mechanism in a direction to move the roller, and to rotate the actuator in a direction reverse to the driving direction to stop the roller;
rotating, using the control unit, the actuator to stop the roller by calculating a first braking force corresponding to a proportional-integral (PI) control related to shifting responsiveness and a second braking force corresponding to a force with which the spring presses the roller to a bottom position in a groove;
rotating the actuator based on a third braking force which is a sum of the first braking force and the second braking force, wherein
when the control unit causes braking of the actuator by rotating the actuator to stop the roller, the control unit calculates a driving speed of the detent mechanism based on an amount of change of an output shaft angle of the actuator,
estimates a speed of the roller attained when the roller reaches a target bottom position in a case in which the actuator is rotated based on a maximum braking force at the output shaft angle, and
rotates the actuator based on the maximum braking force when the estimated speed satisfies a condition.

10. The range switching method of the automatic transmission of claim 9, further comprising, after the rotating the actuator to stop the roller,
stopping the rotating of the actuator at at least one of a lower limit position of the groove, a position before the lower limit position of the groove and within a range of automatic drawing by the spring, or a previous stop position.

* * * * *